United States Patent
Li et al.

(10) Patent No.: US 12,491,181 B2
(45) Date of Patent: Dec. 9, 2025

(54) NIMODIPINE INJECTION COMPOSITION AND PREPARATION METHOD THEREFOR

(71) Applicants: JIANGSU JIUXU PHARMACEUTICAL CO., LTD., Jiangsu (CN); Hong Li, Jiangsu (CN)

(72) Inventors: Hong Li, Jiangsu (CN); Shan Gao, Zhejiang (CN); Lijing Mao, Jiangsu (CN)

(73) Assignees: JIANGSU JIUXU PHARMACEUTICAL CO., LTD., Jiangsu (CN); Hong Li, Jiangsu (CN)

( * ) Notice: Subject to any disclaimer, the term of this patent is extended or adjusted under 35 U.S.C. 154(b) by 766 days.

(21) Appl. No.: 17/274,299

(22) PCT Filed: Sep. 6, 2019

(86) PCT No.: PCT/CN2019/104760
§ 371 (c)(1),
(2) Date: Mar. 8, 2021

(87) PCT Pub. No.: WO2020/048533
PCT Pub. Date: Mar. 12, 2020

(65) Prior Publication Data
US 2021/0338649 A1    Nov. 4, 2021

(30) Foreign Application Priority Data
Sep. 8, 2018   (CN) .......................... 201811046629.4

(51) Int. Cl.
| A61K 31/4422 | (2006.01) |
| A61K 9/00 | (2006.01) |
| A61K 9/107 | (2006.01) |
| A61K 47/10 | (2017.01) |
| A61K 47/12 | (2006.01) |
| A61K 47/14 | (2017.01) |
| A61K 47/18 | (2017.01) |
| A61K 47/24 | (2006.01) |
| A61K 47/44 | (2017.01) |

(52) U.S. Cl.
CPC ........ *A61K 31/4422* (2013.01); *A61K 9/0019* (2013.01); *A61K 9/107* (2013.01); *A61K 47/10* (2013.01); *A61K 47/12* (2013.01); *A61K 47/14* (2013.01); *A61K 47/183* (2013.01); *A61K 47/24* (2013.01); *A61K 47/44* (2013.01)

(58) Field of Classification Search
CPC .. A61K 31/4422; A61K 9/0019; A61K 47/14; A61K 47/44
See application file for complete search history.

(56) References Cited

FOREIGN PATENT DOCUMENTS

| CN | 1732936 A | * | 2/2006 |
| CN | 101797226 A | * | 8/2010 |
| CN | 103893119 A | * | 7/2014 |

OTHER PUBLICATIONS

Kiser, "Pharmacologic options for prevention and management of cerebral vasospasm in aneurysmal subarachnoid hemorrhage", 2013, Hospital Pharmacy, pp. S2-S9 (Year: 2013).*
Kabalnov et al., "Phospholipids as Emulsion Stabilizers", 1996, Journal of Colloid and Interface Science, 184, pp. 227-235 (Year: 1996).*
Grunenberg et al., "Polymorphism in binary mixtures, as exemplified by nimodipine", 1995, International Journal of Pharmaceutics, 118, pp. 11-21 (Year: 1995).*
Palacios et al., "Egg-Yolk Lipid Fractionation and Lecithin Characterization", 2005, JAOCS, pp. 571-578 (Year: 2005).*

* cited by examiner

*Primary Examiner* — Brenda L Coleman
*Assistant Examiner* — Madeline E Braun
(74) *Attorney, Agent, or Firm* — Paratus Law Group, PLLC

(57) ABSTRACT

Disclosed are a nimodipine injection composition and preparation method therefor. The nimodipine injection composition includes the following components in parts by mass concentration: 0.02-0.23% of nimodipine, 2-30% of oil for injection, 0.8-3% of emulsifier, 0-0.1% of complexing agent, 0-0.3% of stabilizer, 1-3% of osmotic pressure adjusting agent. The composition does not contain solubilizers such as ethanol, auxiliary emulsifiers such as tween-80, and cosolvents such as benzyl alcohol.

12 Claims, 2 Drawing Sheets

NIMODIPINE INJECTION COMPOSITION AND PREPARATION METHOD THEREFOR

CROSS REFERENCE TO PRIOR APPLICATION

This application is a National Stage Patent Application of PCT International Patent Application No. PCT/CN2019/104760 (filed on Sep. 6, 2019) under 35 U.S.C. § 371, which claims priority to Chinese Patent Application No. 201811046629.4 (filed on Sep. 8, 2018), which are all hereby incorporated by reference in their entirety.

TECHNICAL FIELD

The present invention belongs to the field of medical technology, and relates to a composition injection and preparation method and non-clinical safety thereof.

BACKGROUND OF THE INVENTION

Nimodipine (Nim), also known as Nimotop, is a second-generation pyridine calcium antagonist. Nimodipine injection was developed and launched by Bayer in Germany in April 1985. Now there are more than 100 manufacturers in China. Nimodipine is easy to penetrate the blood-brain barrier due to its high lipophilicity. In addition, it can selectively dilate cerebral vessels and significantly reverse the spasm of the basilar artery and anterior spinal artery. Therefore, it is clinically used to treat hypertension, stroke, migraine, subarachnoid hemorrhage, and other cerebral hemorrhage diseases. Currently, it is the preferred drug for treating cerebrovascular diseases, especially for senile dementia.

In the prior art, nimodipine preparations commonly used clinically include tablets, capsules, and injections. Nimodipine is insoluble in water, with low solubility and strong liver first-pass effect, reducing the oral bioavailability which is 5-13% and 3-28% respectively in healthy subjects and patients with subarachnoid hemorrhage. With a short biological half-life (about 1.5-2 h), frequent administration is required. i.e. 3-4 times per day, besides the inconvenience for administration, resulting in a "peak-and-valley" pattern of plasma concentration bringing toxic and side effects. Due to its insolubility in water, all nimodipine injections used clinically contain high-concentration ethanol for solubilization, which is very irritating to skin and blood vessels. Hence, nimodipine must be administered by dripping at a slow rate of 1-2 mg/h, otherwise, no patient can tolerate its side effects, that is, 10 mg dose generally requires at least 5 hours. Moreover, it must be infused into the body as a mixture with glucose or normal saline, or separately but synchronously with glucose or normal saline with a special three-way infusion set. In most cases, nimodipine injection is transferred to an infusion bottle for mixing evenly before use. Nimodipine injection is a water-insoluble preparation containing ethanol as it is soluble in ethanol but insoluble in water. When it is co-administrated with other injections, crystallization can be present, which decreases the concentration and effectiveness of the drug and endangers patients to some extent.

There are different crystalline forms for nimodipine, i.e. α and β. The solubility is different in solvents for different crystalline forms. According to published literature, the β-type has a melting point of 124-125° C. and good solubility in water (3.6 μg/mL), while the α-type has a melting point of 114-116° C. and the solubility in water of 2.5 μg/mL. The solubility in an oil phase was not reported yet.

The present invention compares the solubility in oils between a kind of commercial nimodipine (β-type, Xinhua Pharmaceutical) and self-made nimodipine (α-type), and it is found that their solubility in oils is much greater than that in water. Furthermore, the solubility of α-type is much greater than that of β-type both in the medium-chain fatty oil and the mixture of soybean oil and medium-chain fatty oil (see the table below). Therefore, formulating α-type nimodipine into a fat emulsion injection may solve the problems of low drug loading efficiency, poor safety, and poor stability occurring in its solution for injection and other fat emulsions for injection developed by the prior art.

| Solubility Test for Nimodipine in Oil Phase (mg/mL) | | | | |
|---|---|---|---|---|
| Source of Raw Materials | Soybean Oil | Medium-chain Oil | Soybean Oil:Medium-chain Oil (4:6) | Water |
| β-type (normal temperature) | 6.7 | 11.8 | 11.0 | 0.0036 |
| α-type (normal temperature) | 7.5 | 23.22 | 18.1 | 0.0025 |

The main component(s) of emulsion injection, such as soybean oil, medium-chain fatty oil, and the mixture thereof not only act as non-toxic solvent(s), but also introduce and dissolve fat-soluble drug into the lipid core of emulsion particles, the drug is then metabolized and slowly released along with lipid droplets so as to maintain effective plasma concentration and reduce its toxic and side effects. Moreover, the emulsion injection with the composition in the present invention has many other advantages, including increased solubility of nimodipine, increased drug loading efficiency, reduced drug hydrolysis, increased stability, and reduced toxicity, showing a good clinical application prospect.

At present, there are many literatures and patent applications about nimodipine fat emulsion, but all with some shortcomings. For example, Tween 80 is used in the prescription of an issued patent in China with the application number 200910021091.6. There have been many reports of clinical adverse reactions caused by intravenous injections containing Tween 80 which can cause hemolytic reaction, acute hypersensitivity reaction, peripheral neurotoxicity, inhibition of P-glycoprotein activity and intrinsic anti-tumor effect, hepatotoxicity, etc., so intravenous injections containing Tween 80 should be used with caution. The cosolvent benzyl alcohol is used in the prescription of another issued patent in China with the application number 200510081668.4. Benzyl alcohol has the functions of disinfection, antisepsis, and local anesthesia. It is used as a bacteriostatic agent and analgesic agent in injections but with hemolysis action. Intramuscular injection for pediatrics containing benzyl alcohol may cause gluteal muscle contracture. There are strict restrictions on the use of bacteriostatic agents in intravenous injections under the section "Injections" in the Appendix to Chinese Pharmacopoeia (2015 Edition), so it is not recommended. Meanwhile, the crystalline forms are not considered for all the current nimodipine emulsions. The crystalline forms other than α-type have low solubility and poor drug loading efficiency, and tend to crystalize during storage, reducing product stability. Considering the above-mentioned problems in the stability and safety of nimodipine compositions, it is necessary to develop a new nimodipine emulsion composition to meet the clinical needs.

DESCRIPTION OF THE INVENTION

One of the objectives of the present invention is to provide a nimodipine injection composition which comprises the following components: nimodipine, oil for injection, emulsifier, complexing agent, stabilizer, and osmotic pressure adjusting agent.

The said injection composition comprises 0.02-0.23% of nimodipine, 2-30% of oil for injection, 0.8-3% of emulsifier, 0-0.1% of complexing agent, 0-0.3% of stabilizer, and 1-3% of osmotic pressure adjusting agent. One preferred proportion is 0.04-0.20% of nimodipine, 3-20% of oil for injection, 1-2.5% of emulsifier, 0-0.05% of complexing agent, 0-0.2% of stabilizer, and 2-3% of osmotic pressure adjusting agent. A more preferred proportion is 0.08-0.18% of nimodipine, 8-12% of oil for injection, 1-2% of emulsifier, 0-0.01% of complexing agent, 0-0.1% of stabilizer and 2-2.5% of osmotic pressure adjusting agent. The pH value of the formulated nimodipine injection composition is 6.0-8.5, preferably 6.5-8.0, and more preferably 7.0-7.5. The mean particle size of the formulated nimodipine injection compositions is 100-600 nm, preferably 120-400 nm, and more preferably 140-300 nm.

The said nimodipine is selected from α-type or β-type, preferably α-type with the melting point of 114-116° C.

The emulsifier in the said injection composition is selected from soya lecithin or egg yolk lecithin.

The soya lecithin or egg yolk lecithin in the said injection composition contains 60-90% of phosphatidylcholine (PC) and 2-20% of phosphatidyl ethanolamine (PE), preferably 70-85% for phosphatidylcholine (PC) and 5-18% for phosphatidyl ethanolamine (PE).

The complexing agent(s) in the said injection composition may be selected one or more from calcium disodium edetate, disodium edetate, sodium edetate, and edetate acid, preferable disodium edetate.

In the said injection composition, the oil for injection is selected from soybean oil for injection, or medium-chain triglyceride for injection, or the mixture thereof. The mixture of them is preferred, with a mass ratio of soybean oil for injection and medium-chain triglyceride for injection preferably at 2:8-5:5, more preferably at 4:6-5:5, and most preferably at 4:6.

In the said injection composition, the preferred stabilizer is oleic acid or sodium oleate.

In the said injection composition, the osmotic pressure adjusting agent is glycerol.

The present invention also provides a method for preparing the nimodipine injection composition. The present invention has the following advantages: the injection composition contains no solubilizer ethanol, avoiding irritation to skin and blood vessels. The emulsification and solubilization required by the nimodipine injection are achieved without adding auxiliary emulsifiers such as Tween 80 and cosolvents such as benzyl alcohol. Through the study on different ratios of soybean oil and medium-chain triglycerides and different crystalline forms of nimodipine, a method is developed to avoid the oil-water separation caused by excessive use of medium-chain triglycerides while nimodipine can be loaded to the maximum extent. Specifically, the following problems are solved:

1. The stability problem is solved. The proper selection of emulsifiers, i.e. egg yolk lecithin or soya lecithin with a certain content range of phosphatidylcholine (70-85%) and phosphatidyl ethanolamine (5-18%), solves the stability problem, without the auxiliary emulsifier Tween 80, and reducing the risks of sensitization, allergic reaction and hemolysis in clinical application.
2. Through the study on emulsifiers in oil phase and aqueous phase respectively, it is preferred to add a part of an emulsifier into oil phase and the other into aqueous phase, resulting in a better emulsifying effect, more uniform emulsion particles and more stable emulsion.
3. The problems of solubilization and frequent industrial homogenization are solved. The α-type of nimodipine with a melting point of 114-116° C. and the oil for injection with a mass ratio of soybean oil for injection and medium-chain triglyceride for injection at 4:6 are preferred, as it may maximize the drug loading efficiency and avoid oil-water separation.
4. The cosolvents such as benzyl alcohol are not required, thus avoiding adverse reactions caused by benzyl alcohol in clinical use.
5. The oil phase is easier to emulsify and disperse by the addition of medium-chain triglycerides, which can reduce the homogenization times and is more conducive to industrial production.
6. The use of complexing agent can not only achieve antioxidant effect, but also greatly reduce the anisidine value of the preparation and improve the safety of the preparation.
7. Through non-clinical safety studies on allergy, irritation, hemolysis, rats, etc., the results show that:
(1) In the passive anaphylaxis test in rats, sensitized rats showed passive cutaneous anaphylaxis reactions to nimodipine emulsion of the prior art, while sensitized rats had no such reaction to the composition injection of the present invention. In the active systemic anaphylaxis test in guinea pigs, the guinea pigs in the high-dose group of the composition injection of the present invention immediately (about 1 minute) developed prone immobility, followed by death and other similar anaphylaxis reactions, with a mortality of 100%. No significant abnormal reactions were observed in the guinea pigs in the low-dose group. However, both high- and low-dose groups of nimodipine emulsion of the prior art developed prone immobility, followed by death and other similar anaphylaxis reactions, with a mortality rate of 100% in the high dose group and 40% in the low dose group respectively.
(2) The nimodipine emulsion of the prior art had hemolysis and agglutination effects, while the composition injection of the present invention had no hemolysis and agglutination effects.
(3) The vascular irritation test in rabbits showed that both the composition injection of the present invention and the nimodipine emulsion of the prior art had no significant irritating effect on the ear veins (blood vessel) of rabbits.
(4) The muscle irritation test in rabbits showed that both the composition injection of the present invention and the nimodipine emulsion of the prior art had no significant irritation effect on quadriceps femoris of rabbits.

The zebrafish-based cardiovascular toxicity experiments showed that the injection with the composition of this invention would also induce cardiovascular toxicity, such as decreased heart rate, atrial arrest, pericardial edema, and circulatory deficiency as the other three types of nimodipine (the drug substance, solution for injection, and emulsion formulated by existing technology) did. But compared with the lower levels of maximum non-lethal concentration of other three types (2.5 μg/ml for nimodipine drug substance and nimodipine solution for injection, and 5.0 μg/ml for nimodipine emulsion by existing technology), the maximum non-lethal concentration of the injection with the invented composition was up to 10 μg/mL, which was 4 times that of the former two, and 2 times that of the latter, indicating that the toxicity induced by the injection of this invented composition in zebrafish is much less than that of nimodipine drug substance, nimodipine solution for injection, and nimodipine emulsion by existing technology.

For nimodipine solution for injection, the experimental results in rats showed that there were significant toxic and adverse effects in the high dose group, with the death of several rats during the administration. After multiple doses of the nimodipine solution for injection, several animals developed significant phlebitis and tail ulceration. However, for the injection with the composition of this invention, there were no deaths or any other observed adverse effects in neither dose group during the administration.

The technical protocol of the invention is as follows:

The nimodipine injection composition comprises the following components in parts by mass concentration: 0.02-0.23% of nimodipine, 2-30% of oil for injection, 0.8-3% of emulsifier, 0-0.1% of complexing agent, 0-0.3% of stabilizer, 1-3% of osmotic pressure adjusting agent. One preferred proportion is 0.04-0.20% of nimodipine, 3-20% of oil for injection, 1-2.5% of emulsifier, 0-0.05% of complexing agent, 0-0.2% of stabilizer, and 2-3% of osmotic pressure adjusting agent. A more preferred proportion is 0.08-0.18% of nimodipine, 8-12% of oil for injection, 1-2% of emulsifier, 0-0.01% of complexing agent, 0-0.1% of stabilizer and 2-2.5% of osmotic pressure adjusting agent. The pH value of the formulated nimodipine injection composition is 6.0-8.5, preferably 6.5-8.0, and more preferably 7.0-7.5. The mean particle size of the formulated nimodipine injection compositions is 100-600 nm, preferably 120-400 nm, and more preferably 140-300 nm.

The said nimodipine is selected from α-type or β-type, preferably α-type with the melting point of 114-116° C.

In the said nimodipine injection composition, the emulsifier(s) may be selected one or more from soya lecithin, egg yolk lecithin, hydrogenated soybean phospholipid and hydrogenated egg yolk lecithin.

In the said nimodipine injection composition, the complexing agent(s) may be selected one or more from calcium disodium edetate, disodium edetate, sodium edetate and edetate acid.

In the said nimodipine injection composition, the preferred stabilizer is oleic acid or sodium oleate.

In the said nimodipine injection composition, the osmotic pressure adjusting agent is glycerol.

The pH value of the nimodipine injection composition is 6.0-8.5, preferably 6.5-8.0, and more preferably 7.0-7.5.

The mean particle size of the nimodipine injection composition is 100-600 nm, preferably 120-400 nm, and more preferably 140-300 nm.

The present invention also discloses a method for preparing nimodipine injection composition, comprising the following steps:

(1) Take an appropriate amount of water for injection, adjust the pH value, add complexing agent and stabilizer and stir to dissolve it, then add the osmotic pressure adjusting agent, mix well to obtain the aqueous phase, and control the water temperature at 50-70° C.

The complexing agent(s) may be selected one or more from calcium disodium edetate, disodium edetate, sodium edetate and edetate acid, and the preferable complexing agent is disodium edetate. The preferred osmotic pressure adjusting agent is glycerol.

(2) Take an appropriate amount of oil for injection, add 40% of the formulated amount of emulsifier and stabilizer, shear and mix well, heat in a water bath to 50-70° C., add nimodipine and stir to dissolve it to obtain the oil phase. The said nimodipine is selected from α-type or β-type, preferably α-type with the melting point of 114-116° C.

The said oil for injection is selected from soybean oil for injection, or medium-chain triglyceride for injection, or the mixture thereof. The mixture of them is preferred, with a mass ratio of soybean oil for injection and medium-chain triglyceride preferably at 2:8-5:5, more preferably at 4:6-5:5, and most preferably at 4:6.

(3) Add sodium oleate to the aqueous phase (1) in case sodium oleate is used as the stabilizer add oleic acid to the oil phase (2) in case oleic acid is used.

(4) Add 60% of the formulated amount of emulsifier to the aqueous phase, and shear the emulsifier to disperse evenly under nitrogen protection.

The emulsifier is selected from soya lecithin or egg yolk lecithin, which has a phosphatidylcholine (PC) content of 60-90% and a phosphatidyl ethanolamine (PE) content of 2-20%. The preferable ranges of the phosphatidylcholine (PC) content and the phosphatidyl ethanolamine (PE) content in the soya lecithin or egg yolk lecithin are 70-85% and 5-18% respectively.

(5) Add the oil phase slowly to the aqueous phase and shear it into coarse emulsion.

(6) Homogenize the coarse emulsion, and circulate until the particle size of emulsion conforms to the provisions.

(7) Measure the pH value and the emulsion particle size of the sample, fill with nitrogen, and perform filling, sealing and sterilization.

PREFERRED EMBODIMENTS OF THE INVENTION

Figure 1:
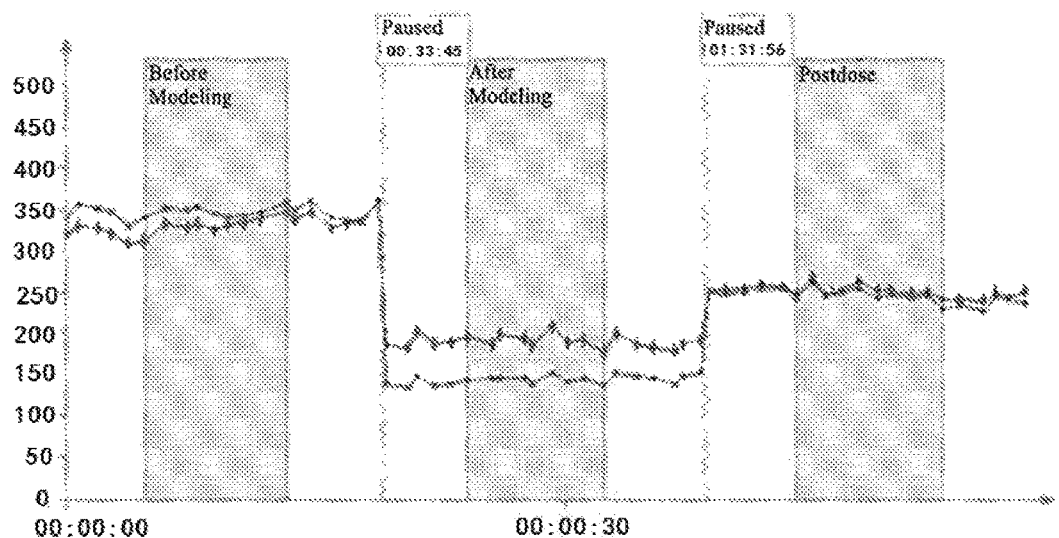
FIG. 1 shows the cerebral blood flow change diagram of No. 9 rat in the high-dose group of the composition of the present invention, with the circular-point curve for the whole brain area, and the diamond curve for the sagittal suture zone.

The present invention is further detailed as follows in combination with examples, but is not limited to these examples:

Example 1

A total of 1 g of nimodipine, 40 g of soybean oil, 60 g of medium-chain triglyceride, 12 g of egg yolk lecithin, 0.05 g of disodium edetate, 0.3 g of oleic acid, 22.5 g of glycerol, an appropriate amount of pH regulator, and water for injection to get 1000 ml. The preparation method is as follows:
(1) Take the formulated amount of water for injection, adjust the pH value with 2% sodium hydroxide solution, add disodium edetate, stir to dissolve it, then add glycerol, and mix well. Control the water temperature at 50-70° C.
(2) Take and mix the formulated amount of soybean oil and medium-chain triglyceride, add 40% of the formulated amount of egg yolk lecithin and oleic acid, shear and mix well, heat in a water bath to 50-70° C., add the formulated amount of nimodipine and stir to dissolve it.
(3) Add 60% of the formulated amount of egg yolk lecithin to the aqueous phase, and shear the emulsifier to disperse evenly under nitrogen protection.
(4) Add the oil phase slowly to the aqueous phase and shear it into coarse emulsion.
(5) Homogenize the coarse emulsion, and circulate until the particle size of emulsion conforms to the provisions.
(6) Measure the pH value and the emulsion particle size of the sample; in case the values are acceptable, filter through the filter membrane, fill with nitrogen, and perform filling and sealing.
(7) Sterilize at 121° C. for 12 min.
(8) The pH value is 7.3, and the mean particle size is 155 nm.

Example 2

A total of 1.5 g of nimodipine, 40 g of soybean oil, 60 g of medium-chain triglyceride, 12 g of egg yolk lecithin, 0.05 g of disodium edetate, 0.3 g of oleic acid, 22.5 g of glycerol, an appropriate amount of pH regulator, and water for injection to get 1000 ml. The preparation method is as follows:
(1) Take the formulated amount of water for injection, adjust the pH value with 2% sodium hydroxide solution, add disodium edetate, stir to dissolve it, then add glycerol, and mix well. Control the water temperature at 50-70° C.
(2) Take and mix the formulated amount of soybean oil and medium-chain triglyceride, add 40% of the formulated amount of egg yolk lecithin and oleic acid, shear and mix well, heat in a water bath to 50-70° C., add the formulated amount of nimodipine and stir to dissolve it.
(3) Add 60% of the formulated amount of egg yolk lecithin to the aqueous phase, and shear the emulsifier to disperse evenly under nitrogen protection.
(4) Add the oil phase slowly to the aqueous phase and shear it into coarse emulsion.
(5) Homogenize the coarse emulsion, and circulate until the particle size of emulsion conforms to the provisions.
(6) Measure the pH value and the emulsion particle size of the sample; in case the values are acceptable, filter through the filter membrane, fill with nitrogen, and perform filling and sealing.
(7) Sterilize at 121° C. for 12 min.
(8) The pH value is 6.9, and the mean particle size is 162 nm.

Example 3

A total of 0.2 g of nimodipine, 50 g of soybean oil, 8 g of egg yolk lecithin, 0 g of disodium edetate, 0.2 g of sodium oleate, 25 g of glycerol, an appropriate amount of pH regulator, and water for injection to get 1000 ml. The preparation method is as follows:
(1) Take the formulated amount of water for injection, adjust the pH value, add sodium oleate, stir to dissolve it, then add glycerol and mix well. Control the water temperature at 50-70° C.
(2) Take and mix the formulated amount of soybean oil and medium-chain triglyceride, heat in a water bath to 50-70° C., add 40% of the formulated amount of egg yolk lecithin, shear and mix well, add the formulated amount of nimodipine and stir to dissolve it.
(3) Add 60% of the formulated amount of egg yolk lecithin to the aqueous phase, and shear the emulsifier to disperse evenly under nitrogen protection.
(4) Add the oil phase slowly to the aqueous phase and shear it into coarse emulsion.
(5) Homogenize the coarse emulsion, and circulate until the particle size of emulsion conforms to the provisions.
(6) Measure the pH value and the mean emulsion particle size of the sample; in case the values are acceptable, filter through the filter membrane, fill with nitrogen, and perform filling and sealing.
(7) Sterilize at 121° C. for 12 min.
(8) The pH value is 7.4, and the mean particle size is 150 nm.

Example 4

A total of 2.3 g of nimodipine, 80 g of soybean oil, 120 g of medium-chain triglyceride, 15 g of egg yolk lecithin, 0.1 g of disodium edetate, 1 g of oleic acid, 20 g of glycerol, an appropriate amount of pH regulator, and water for injection to get 1000 ml.
The preparation method is the same as Example 1.
The pH value is 7.2, and the mean particle size is 296 nm.

Example 5

A total of 0.4 g of nimodipine, 40 g of soybean oil, 60 g of medium-chain triglyceride, 8 g of egg yolk lecithin, 0.03 g of disodium edetate, 0.3 g of oleic acid, 22.5 g of glycerol, an appropriate amount of pH regulator, and water for injection to get 1000 ml.
The preparation method is the same as Example 1.
The pH value is 7.9 and the mean particle size is 600 nm.

Example 6

A total of 0.8 g of nimodipine, 30 g of soybean oil, 70 g of medium-chain triglyceride, 30 g of egg yolk lecithin, 0.0 g of disodium edetate, 0.0 g of oleic acid, 22.5 g of glycerol, an appropriate amount of pH regulator, and water for injection to get 1000 ml.
The preparation method is the same as Example 1.
The pH value is 6.8 and the mean particle size is 146 nm.

Example 7

A total of 1.2 g of nimodipine, 120 g of soybean oil, 180 g of medium-chain triglyceride, 30 g of egg yolk lecithin, 0.0 g of disodium edetate, 0.3 g of oleic acid, 20 g of glycerol, an appropriate amount of pH regulator, and water for injection to get 1000 ml.
The preparation method is the same as Example 1.
The pH value is 6.5 and the mean particle size is 352 nm.

Example 8

A total of 1.2 g of nimodipine, 50 g of soybean oil, 50 g of medium-chain triglyceride, 30 g of egg yolk lecithin, 0.0 g of disodium edetate, 0.0 g of oleic acid, 22.5 g of glycerol, an appropriate amount of pH regulator, and water for injection to get 1000 ml.

The preparation method is the same as Example 1.

The pH value is 8.5 and the mean particle size is 246 nm.

In order to determine the maximum drug loading capacity of the present invention without adding any cosolvent and the optimal formulation and process without adding any auxiliary emulsifier, the inventor has conducted numerous studies, and the study results are as follows:

1. A study on the optimal ratio of soybean oil to medium-chain triglyceride to get the best loading capacity was conducted.

As the solubility of nimodipine in soybean oil and medium-chain triglyceride varies, different ratios will cause difference in drug loading efficiency. In addition, excessive use of medium-chain triglyceride will cause the oil to leave out from the emulsion. On the basis of the formulation of Example 1, a study on oil phases in different ratios to get the optimal loading capacity was conducted.

TABLE 1

Stability Study of the Composition Injection of the Present Invention in Different Ratios of Oil Phases

| Soybean Oil:Medium-chain Triglyceride | Description | δ-potential (mv) | Particle Size (nm) |
|---|---|---|---|
| 6:4 | Needle-like nimodipine precipitated after filtration | −16.2 | 206 |
| 5:5 | Needle-like nimodipine precipitated after filtration | −19.3 | 182 |
| 4:6 | Homogeneous emulsion | −27.6 | 155 |
| 3:7 | A small amount of oil droplets | −17.5 | 146 |
| 2:8 | Oil droplets | −11.8 | 141 |

Conclusion: The formulation is optimal when the ratio of soybean oil to medium-chain triglyceride is 4:6.

2. The effect of different contents of phosphatidylcholine (PC) and phosphatidyl ethanolamine in lecithin on the stability of the emulsion was investigated on the basis of the formulation of Example 1.

TABLE 2

Influence of Lecithin with Different PC and PE Contents on the Composition Injection of the Present Invention

| Lecithin Source and PC/PE Contents | Description | δ-potential (mv) | Particle Size (nm) |
|---|---|---|---|
| Soya lecithin PC51.5%:PE23.3% | A small amount of oil droplets | −11.9 | 198 |
| Soya lecithin PC70.2%:PE16.5% | Homogeneous emulsion | −23.8 | 157 |
| Soya lecithin PC76.7%:PE8.6% | Homogeneous emulsion | −25.3 | 152 |
| Egg yolk lecithin PC82.0%:PE12.3% | Homogeneous emulsion | −27.6 | 155 |
| Egg yolk lecithin PC84.7%:PE11.7% | Homogeneous emulsion | −27.1 | 151 |
| Soya lecithin PC95.0%:PE0% | Homogeneous emulsion | −19.5 | 148 |

Conclusion: The lecithin emulsifying capacity is optimal when the contents of phosphatidylcholine (PC) and phosphatidyl ethanolamine (PE) are 70%-85% and 5%-18% respectively in the soya lecithin or egg yolk lecithin.

3. The effect of lecithin added with aqueous phase or oil phase on the composition injection of the present invention was investigated on the basis of the formulation of Example 1.

TABLE 3

Effect of Lecithin Added with Aqueous Phase or Oil Phase on the Composition Injection of the Present Invention

| Lecithin Added with Aqueous Phase or Oil Phase | Description | δ-potential (mv) | Particle Size (nm) |
|---|---|---|---|
| Dispersed in oil phase | Homogeneous emulsion | −18.6 | 169 |
| Half dispersed in oil phase and half dispersed in aqueous phase | Homogeneous emulsion | −21.5 | 160 |
| Dispersed in aqueous phase | Homogeneous emulsion | −27.6 | 155 |

Conclusion: The composition of the present invention has higher δ-potential and higher stability when the lecithin is added with aqueous phase or together with oil phase.

4. The effect of the complexing agent on the value of anisidine of the composition injection of the present invention was investigated in Example 6.

TABLE 4

Effect of the Complexing Agent on the Value of Anisidine of the Composition Injection of the Present Invention

| Type of Antioxidant | Data Anisidine (According to the recommendations by the Pharmacopoeia Commission, this value should be less than 5) |
|---|---|
| Filled with nitrogen strictly throughout the process | 8.9 |
| Conventional antioxidant (non-complexing agent) | 8.1 |
| Antioxidant (complexing agent) | 2.4 |

Conclusion: The metal ion complexing agent can be utilized to realize antioxidation independently, considerably reducing the value of anisidine in the preparation, and improving the safety of the preparation. Adding other antioxidants cannot reduce the value of anisidine in the composition injection of the present invention.

In order to determine the stability of the preparation process of the present invention, the pilot-scale test was conducted according to Example 1, together with the dilution stability study and long-term stability study.

The test includes the following steps: transfer two parts of the composition injection of the present invention (each 30 ml) to a 250 ml volumetric flask, dilute to volume with 0.9% sodium chloride injection and 5% glucose injection, respectively and mix well to obtain the compatibility test solution. Measure the pH value and emulsion particle size, related substances and assay of the above solutions at 0 h, 2 h, 4 h, 6 h, 8 h and 12 h, respectively. The results are listed in the table below.

TABLE 5

Compatibility Test of the Composition Injection of the
Present Invention by Dilution with
0.9% Sodium Chloride Injection

| Dilution Time | pH | Emulsion Particle Size (nm) Mean Particle Size | Emulsion Particle Size (nm) d (0.9) Particle Size | Emulsion Particle Larger Than 5 μm | Impurity I | Related Substances (%) Maximum Individual Impurity | Total Impurities | Assay (%) |
|---|---|---|---|---|---|---|---|---|
| 0 h | 6.54 | 151 | 221 | Not detected | 0.08 | 0.29 | 0.66 | 99.8 |
| 2 h | 6.58 | 148 | 223 | Not detected | 0.14 | 0.30 | 0.64 | 99.6 |
| 4 h | 6.60 | 154 | 224 | Not detected | 0.23 | 0.28 | 0.70 | 100.4 |
| 6 h | 6.45 | 154 | 224 | Not detected | 0.11 | 0.30 | 0.61 | 99.8 |
| 8 h | 6.48 | 154 | 224 | Not detected | 0.10 | 0.29 | 0.60 | 99.0 |
| 12 h | 6.49 | 154 | 224 | Not detected | 0.11 | 0.29 | 0.61 | 99.2 |

TABLE 6

Compatibility Test of the Composition Injection of the Present
Invention by Dilution with 5% Glucose Injection

| Dilution Time | pH | Emulsion Particle Size (nm) Mean Particle Size | Emulsion Particle Size (nm) d (0.9) Particle Size | Emulsion Particle Larger Than 5 μm | Impurity I | Related Substances (%) Maximum Individual Impurity | Total Impurities | Assay (%) |
|---|---|---|---|---|---|---|---|---|
| 0 h | 4.76 | 151 | 221 | Not detected | 0.06 | 0.27 | 0.54 | 99.0 |
| 2 h | 4.84 | 151 | 220 | Not detected | 0.10 | 0.20 | 0.63 | 99.1 |
| 4 h | 4.92 | 151 | 220 | Not detected | 0.04 | 0.27 | 0.55 | 99.6 |
| 6 h | 4.71 | 151 | 220 | Not detected | 0.05 | 0.27 | 0.56 | 98.8 |
| 8 h | 4.67 | 151 | 220 | Not detected | 0.09 | 0.27 | 0.58 | 98.8 |
| 12 h | 4.71 | 150 | 219 | Not detected | 0.05 | 0.28 | 0.56 | 97.8 |

According to the results of the main tests on the diluted samples, there were no significant changes in the pH value, emulsion particle size, related substances, and assay of all diluted samples within 12 h. Therefore, the composition injection of the present invention diluted with glucose injection or sodium chloride injection in clinical use is safe and reliable within 12 h.

The composition injection of the present invention was placed under the condition of 25±2° C., protected from light, sampled once at 0, 3, 6, 9, 12, and 18 months, respectively, tested according to the key items of stability study, and compared with the values at 0 month.

TABLE 7

Long-term Stability Study of the Composition Injection
of the Present Invention

| Tests | Month 0 | Month 3 | Month 6 | Month 9 | Month 12 | Month 18 |
|---|---|---|---|---|---|---|
| Description | White homogeneous emulsion | White homogeneous emulsion | White homogeneous emulsion | White homogeneous emulsion | White homogeneous emulsion | White homogeneous emulsion |

TABLE 7-continued

Long-term Stability Study of the Composition Injection of the Present Invention

| Tests | | Month 0 | Month 3 | Month 6 | Month 9 | Month 12 | Month 18 |
|---|---|---|---|---|---|---|---|
| Identification | | Conformed | Conformed | Conformed | Conformed | Conformed | Conformed |
| pH | | 7.28 | 7.23 | 7.07 | 7.04 | 6.84 | 6.75 |
| Osmolality (mOsmol/Kg) | | 295 | 299 | 295 | 309 | 304 | 305 |
| Free Fatty Acid (mmol/L) | | 1.6 | 1.8 | 1.9 | 2.1 | 2.2 | 2.8 |
| Peroxide value (ml) | | 0 | 0 | 0 | 0 | 0 | 0 |
| Lysophospholipid (mg/mL) | | 0.33 | 0.42 | 0.42 | 0.43 | 0.57 | 0.63 |
| Anisidine value | | 2.4 | 2.6 | 2.5 | 2.6 | 2.8 | 2.6 |
| Visible particles | | Conformed | — | — | — | — | — |
| Related substances | Impurity 1 (%) | 0.12 | 0.20 | 0.22 | 0.10 | 0.23 | 0.18 |
| | Maximum individual impurity (%) | 0.32 | 0.27 | 0.29 | 0.28 | 0.29 | 0.30 |
| | Total impurities (%) | 0.79 | 0.77 | 0.84 | 0.65 | 0.92 | 0.86 |
| Emulsion particle size | Mean particle size (nm) | 151 | 150 | 151 | 151 | 150 | 151 |
| | 90% particle size (nm) | 220 | 220 | 220 | 220 | 219 | 221 |
| | Emulsion particle larger than 5 μm | Not detected | Not detected | Not detected | Not detected | Not detected | Not detected |
| Assay (%) | | 100.1 | 98.8 | 99.3 | 100.5 | 98.2 | 98.7 |
| Sterility | | Conformed | — | Conformed | — | — | — |
| Bacterial endotoxin | | Conformed | — | Conformed | — | — | — |

It can be seen from the test results that after 18 months of long-term stability investigation at 25±2° C., all the indicators of the composition injection of the present invention meet the requirements, indicating that the quality of the composition injection of the present invention is stable under the storage conditions of 2~25° C.

In order to verify the non-clinical safety of the composition injection of the present invention, special safety tests such as anaphylaxis, hemolysis and local (blood vessels, skin, mucosa, muscle, etc.) irritation, as well as zebrafish test and pharmacodynamic test on the model of subarachnoid hemorrhage in rats were carried out on the composition injection of the present invention as prepared in Example 1. The experimental results are as follows:

I. Special Safety Tests Such as Anaphylaxis, Hemolysis and Local (Blood Vessel, Skin, Mucosa, Muscle, Etc.) Irritation were Carried Out on the Composition Injection of the Present Invention.

1. Anaphylaxis Test 1.1 Passive Anaphylaxis Test in Rats

After 48 hours of passive sensitization by intradermal injection of 0.1 mL of the corresponding antiserum into healthy and clean SD rats, each group was then intravenously injected with 8 and 4 mg/kg of the composition injection of the present invention, 8 and 4 mg/kg of nimodipine emulsion prepared by the patented process of the prior art (Application No: 200910021091.6, containing Tween 80 in the formulation), 100 mg/kg of bovine serum albumin, and 10 mL/kg of 0.9% NaCl Injection, together with 1 mL/animal of 1% Evans blue solution for the stimulation. The anatomical results after 30 minutes showed that there was no blue stain in the inner layer of the hack skin of rats in the 8 and 4 mg/kg dose groups of the composition injection of the present invention and the negative control group of 0.9% NaCl injection. However, significant blue stains (greater than 5 mm in diameter) appeared in the inner layer of the back skin of rats in the 8 and 4 mg/kg dose groups of nimodipine emulsion prepared by the patented process of the prior art and the bovine serum albumin positive control group, indicating a positive blue stain reaction. Under the condition of the doses in this test, sensitized rats had passive cutaneous anaphylaxis reactions to the nimodipine emulsion of the prior art, while no passive cutaneous anaphylaxis reaction to the composition injection of the present invention.

TABLE 8

Results of Blue Stain Reaction in the Passive Cutaneous Anaphylaxis Test of the Composition Injection of the Present Invention in Rats

| Dose Group | Blue Stain Reaction (mm, ± s) |
|---|---|
| 8 mg/kg of composition injection of the present invention | − |
| 4 mg/kg of composition injection of the present invention | − |
| 8 mg/kg of nimodipine emulsion of the prior art | + (18.0 ± 3.6) |
| 4 mg/kg of nimodipine emulsion of the prior art | + (11.6 ± 3.3) |
| 10 mL/kg of 0.9% NaCl Injection | − |
| 100 mg/kg of bovine serum albumin | + (22.0 ± 4.3) |

Note:
− indicates negative, + indicates positive.

1.2 Active Systemic Anaphylaxis Test in Guinea Pigs

Healthy white guinea pigs were sensitized intraperitoneally of the composition injection of the present invention at doses of 4 and 2 mg/kg, respectively, every other day for 3 consecutive times. On Day 13 after the last sensitization, the composition injection of the present invention was single intravenous injected at the sensitizing dose for the stimulation. The sensitization and stimulation test methods of the nimodipine emulsion of the prior art were the same as above.

The guinea pigs in the high-dose group of the composition injection of the present invention immediately (about 1 minute) developed prone immobility, followed by death and other similar anaphylaxis reactions, with a mortality of 100%. No significant abnormal reaction was observed in the guinea pigs in the low-dose group. However, both high- and low-dose groups of nimodipine emulsion of the prior art developed prone immobility, followed by death and other similar anaphylaxis reactions, with a mortality rate of 100% in the high dose group and 40% in the low dose group respectively. The guinea pigs in the high- and low-dose groups of the composition injection of the present invention, the nimodipine emulsion of the prior art and the bovine serum albumin positive control group had no obvious abnormal reaction during sensitization, and their average body weight at the first sensitization, last sensitization and challenge was similar to that of the 0.9% NaCl injection negative control group at the corresponding time (P>0.05). After the stimulation the guinea pigs in the bovine serum albumin positive control group had obvious anaphylaxis reaction symptoms, mainly manifested as restlessness, piloerection, shivering, scratching nose, sneezing, cough, shortness of breath, urination, lacrimation, dyspnea, instability of gait, wheezing, jumping, spasm and even death. The intensity of anaphylaxis reaction was ++~++++, the death happened about 5 minutes after administration, and the surviving guinea pigs with anaphylaxis reaction gradually returned to normal within 30 minutes after administration, with a total reaction rate at 100%, and a mortality rate at 50%. Under the conditions of this test, guinea pigs had anaphylaxis reactions to 2 mg/kg of nimodipine emulsion of the prior art, while no anaphylaxis reaction to 2 mg/kg of the composition injection of the present invention.

2. Hemolysis Test

Operated in the conventional hemolysis test method used for drugs, each tube of 0.1~0.5 mL of the composition injection of the present invention showed no hemolysis or agglutination within 3 hours, just the same as the negative control tube of 0.9% NaCl Injection. The nimodipine emulsion of the prior art and distilled water positive control tube all showed complete hemolysis at each time point. Under the conditions of the test, the nimodipine emulsion of the prior art had hemolysis and agglutination effects, while the composition injection of the present invention had no hemolysis and agglutination effects.

3. Vascular Irritation Test in Rabbits

Rabbits were slowly injected with 1 mg (10 mL)/(kg·d) of the composition injection of the present invention and the nimodipine emulsion of the prior art, respectively, once daily for 7 consecutive days, in the ear vein (blood vessel). Necropsy was performed 96 hours after drug withdrawal, and gross observation showed no obvious abnormality for nimodipine emulsion of both the present invention and the prior art. In histopathological examination, only 2 rabbits showed cloudy swelling in endothelial cells of ear vein close to the injection site, with mild edema in surrounding stroma, but without thrombosis, embolism nor a wide range of such serious irritant lesions as hemorrhage, edema, and necrosis, showing no significant difference compared with the 0.9% NaCl Injection control group. It was ranked as "<1" comprehensively judged according to the scoring criteria of a vascular irritation test. Under the condition of the test doses, according to the judgment in terms of "vascular irritation intensity", both the composition injection of the present invention and the nimodipine emulsion of the prior art had no significant irritating effect on the ear veins (blood vessels) of rabbits.

4. Muscle irritation Test in Rabbits

Rabbits were injected with 0.1 mg (1 mL)/(kg·d) of the composition injection of the present invention and the nimodipine emulsion of the prior art, respectively, once daily for 7 consecutive days, in the quadriceps femoris of both the left and right legs. In the gross examination 48 hours after drug withdrawal, 8 rabbits showed congestion lesions of less than 0.5×1.0 cm at the injection site in one leg; other rabbits showed no significant congestion, swelling nor necrosis lesions at the injection site, with the sum of reaction grades for all quadriceps femoris up to 4, less than 6. Histopathological examination showed lesions mainly as small-focal or micro-focal interstitial hyperplasia and mononuclear cell infiltration in the quadriceps femoris at the injection site, with mild cloudy swelling or basophilic degeneration in muscle fiber in some lesions, only slightly more severe compared with the 0.9% NaCl Injection control group examined at the same period, but with a limited overall lesion range, without significant extensive muscle fiber degeneration, necrosis nor interstitial inflammatory infiltration, congestion, hemorrhage, edema nor other serious irritant lesions. Under the condition of the test doses, according to the grading standard of muscle irritation reaction, both the composition injection of the present invention and the nimodipine emulsion of the prior art had no significant irritation effect on quadriceps femoris of rabbits.

5. Summary:

(1) In the passive anaphylaxis test in rats, the sensitized animals showed passive cutaneous anaphylaxis reactions to nimodipine emulsion of the prior art, while no such reaction to the composition injection of the present invention. In the systemic active anaphylaxis test in guinea pigs, the animals in the high-dose group of the composition injection of the invention immediately (about 1 minute) developed prone immobility, followed by death and other similar anaphylaxis reactions, with a mortality of 100%, but no significant abnormal reactions were observed in the guinea pigs in the low-dose group. However, both high- and low-dose groups of nimodipine emulsion of the prior art developed prone immobility, followed by death and other similar anaphylaxis reactions, with a mortality rate of 100% in the high dose group and 40% in the low dose group respectively.

(2) The nimodipine emulsion of the prior art had hemolysis and agglutination effects, while the composition injection of the present invention had no hemolysis and agglutination effects.

(3) The vascular irritation test in rabbits showed that both the composition injection of the present invention and the nimodipine emulsion of the prior art had no significant irritating effect on the ear veins (blood vessels) of rabbits.

(4) The muscle irritation test in rabbits showed that both the composition injection of the present invention and the nimodipine emulsion of the prior art had no significant irritation effect on quadriceps femoris of rabbits.

II. The Cardiovascular Toxicity Study in the Zebrafish Model on the Composition Injection of the Present Invention is as Follows:

1. Administration to Fishes by Dissolving the Drug into the Water 1.1 Drugs

The drugs to be tested in this project include nimodipine drug substance, Nimotop (produced by Bayer), composition injection of the present invention (prepared according to Example 1) and blank emulsion, and nimodipine emulsion prepared by the patented process of the prior art (Application No. 200910021091.6, containing Tween 80 in the formulation). All were provided by Zhejiang Jiuxu Pharmaceutical Co., Ltd.

1.2 Test Instruments and Reagents

Dissecting microscope (SMZ645, Nikon, Japan); precision electron balance (CP214, Ohaus); six-well plate (Nest Biotech).

Zebrafish and Water for Fish Farming

The zebrafish larvae observed in the experiment were naturally incubated with embryos produced in the fertility experiment. Quality of water for fish farming: Add 200 mg instant sea salt into 1 L reverse osmosis water, with conductivity of 480-510 µS/cm, pH of 6.9-7.2 and hardness of 53.7-71.6 mg/L $CaCO_3$. After completion of the experiment, zebrafish at various developmental stages were anesthetized and sacrificed with 0.25 mg/mL of tricaine methanesulfonate. The procedures for euthanasia complied with the American Veterinary Medical Association's (AVMA) code for euthanasia of animals.

1.3 Test Method

Wild-type AB zebrafish larvae at a certain stage were treated with the drugs to be tested for 24 hours, at five initial test concentrations, 0.1 µg/mL, 1 µg/mL, 10 µg/mL, 100 µg/mL and 500 µg/mL, with a blank control group respectively, and 30 zebrafish for each concentration of each drug. At the end of drug treatment, the number of zebrafish deaths in each experimental group was counted to provide a basis for the next experimental concentration design. The test concentration range of the drugs to be tested had an upper limit of 1,000 µg/mL (if the maximum solubility was less than 1,000 µg/mL, the highest solubility should prevail) and a lower limit of 0.001 µg/mL.

1.4 Comparison of Lethality in Zebrafish

Compared with the lower levels of maximum non-lethal concentration of other three types (2.5 µg/ml for nimodipine drug substance and nimodipine solution for injection, and 5.0 µg/ml for nimodipine emulsion by the prior art), the maximum non-lethal concentration of the injection with the invented composition was up to 10 µg/mL, which was 4 times that of the former two, and 2 times that of the latter, indicating that the toxicity induced by the injection of this invented composition in zebrafish is much less than that of nimodipine drug substance, nimodipine solution for injection, and nimodipine emulsion by the prior art.

TABLE 9

Comparison of Lethality of Four Types of Nimodipine in Zebrafish

| Drugs | Concentration Mortality | | | | | | |
|---|---|---|---|---|---|---|---|
| | 0.625 (µg/ml) | 1.25 (µg/ml) | 2.5 (µg/ml) | 5.0 (µg/ml) | 10 (µg/ml) | 20 (µg/ml) | 40 (µg/ml) |
| Drug substance | 0 | 0 | 0 | 26.7 | / | / | / |
| Solution for injection | 0 | 0 | 0 | 36.7 | / | / | / |
| Nimodipine emulsion of the prior art | 0 | 0 | 0 | 0 | 32.6 | / | / |
| Composition injection of the present invention | 0 | 0 | 0 | 0 | 0 | 30.0 | 63.3 |

1.5 Comparison of Heart Rate Reduction in Zebrafish

Zebrafish heart rate slowed as drug concentrations increased. Among them, the heart rate of zebrafish slowed down greatly with the increase of drug concentration of nimodipine drug substance, nimodipine solution for injection or nimodipine emulsion of the prior art, while the heart rate of zebrafish slowed down less with the increase of drug concentration of the composition injection of the present invention.

TABLE 10

Comparison of Heart Rate Reduction Induced by Four Types of Drug in Zebrafish

| Drugs | Concentration Relative Heart Rate | | | | | | |
|---|---|---|---|---|---|---|---|
| | 0.625 (µg/ml) | 1.25 (µg/ml) | 2.5 (µg/ml) | 5.0 (µg/ml) | 10 (µg/ml) | 20 (µg/ml) | 40 (µg/ml) |
| Drug substance | 97.0 | 94.8 | 76.4 | 58.5 | / | / | / |
| Solution for injection | 102.7 | 88.5 | 71.6 | 52.7 | / | / | / |
| Nimodipine emulsion of the prior art | 99.2 | 95.2 | 78.6 | 63.5 | 53.9 | / | / |
| Composition injection of the present invention | 98.2 | 96.3 | 92.6 | 80.6 | 77.2 | 74.7 | 60.1 |

1.6 Comparison of Incidence of Atrial Arrest in Zebrafish

Nimodipine drug substance, nimodipine solution for injection, and nimodipine emulsion by prior art induced atrial arrest in some zebrafish at 2.5 μg/ml, and the incidence of atrial arrest in zebrafish induced by nimodipine drug substance, nimodipine solution for injection, and nimodipine emulsion by prior art hit 90%, 100%, and 70% respectively at 5.0 μg/ml. However, the composition injection of the present invention induced atrial arrest in some zebrafish at the concentration up to 20 μg/ml, and 100% atrial arrest at the concentration up to 40 μg/ml, both of which were obviously higher than that of nimodipine drug substance, nimodipine solution for injection, and nimodipine emulsion by prior art.

TABLE 11

Comparison of Incidence of Atrial Arrest in Zebrafish induced by Four Types of Drug

| Drugs | Concentration Incidence of Atrial Arrest | | | | | | |
|---|---|---|---|---|---|---|---|
| | 0.625 (μg/ml) | 1.25 (μg/ml) | 2.5 (μg/ml) | 5.0 (μg/ml) | 10 (μg/ml) | 20 (μg/ml) | 40 (μg/ml) |
| Drug substance | 0 | 0 | 10 | 90 | / | / | / |
| Solution for injection | 0 | 0 | 40 | 100 | / | / | / |
| Nimodipine emulsion of the prior art | 0 | 0 | 5 | 70 | / | / | / |
| Composition injection of the present invention | 0 | 0 | 0 | 0 | 0 | 50 | 100 |

1.7 Comparison of Incidence of Pericardial Edema in Zebrafish

All the four types of drug induced pericardial edema in zebrafish with the incidence increased when elevating the drug concentration. Among them, the incidence of pericardial edema in zebrafish induced by nimodipine solution for injection increased the fastest with the elevated concentration, with pericardial edema in all zebrafish induced at 2.5 μg/ml; nimodipine drug substance took second place with pericardial edema in all zebrafish induced at 5.0 μg/ml, followed by nimodipine emulsion by prior art with pericardial edema in all zebrafish induced at 10.0 μg/ml; while the composition injection of the present invention saw the slowest increase with pericardial edema in all zebrafish induced at up to 20 μg/ml.

TABLE 12

Comparison of Incidence of Pericardial Edema in Zebrafish Induced by Four Types of Drug

| Drugs | Concentration Incidence of Pericardial Edema | | | | | | |
|---|---|---|---|---|---|---|---|
| | 0.625 (μg/ml) | 1.25 (μg/ml) | 2.5 (μg/ml) | 5.0 (μg/ml) | 10 (μg/ml) | 20 (μg/ml) | 40 (μg/ml) |
| Drug substance | 10 | 20 | 50 | 100 | / | / | / |
| Solution for injection | 10 | 30 | 100 | 100 | / | / | / |
| Nimodipine emulsion of the prior art | 5 | 10 | 40 | 60 | 100 | 100 | / |
| Composition injection of the present invention | 0 | 0 | 10 | 30 | 70 | 100 | 100 |

1.8 Summary

Experimental results showed that the composition injection of the present invention would also induce cardiovascular toxicity, such as decreased heart rate, atrial arrest, pericardial edema, and circulatory deficiency as the other three types of nimodipine (the drug substance, solution for injection, and nimodipine emulsion by prior art) did. But compared with the lower levels of maximum non-lethal concentration of other three types (2.5 μg/ml for nimodipine drug substance and nimodipine solution for injection, and 5.0 μg/ml for nimodipine emulsion by existing technology), the maximum non-lethal concentration of the injection with the invented composition was up to 10 μg/mL, which was 4 times that of the nimodipine drug substance and nimodipine solution for injection, and 2 times that of the nimodipine emulsion by existing technology, indicating that the toxicity induced by the injection of this invented composition in zebrafish is much less than that of nimodipine drug substance, nimodipine solution for injection, and nimodipine emulsion by existing technology.

2. Administration via Yolk Sac Injection

2.1 Test Design

Wild-type AB zebrafish larvae were treated with the drugs to be tested for 24 hours via yolk sac injection administration with a maximum dose volume of 40 nl, and the five initial test concentrations were: 0.1 mg/mL, 1 mg/mL, 10 mg/mL, 100 mg/mL, and 500 mg/mL, respectively. At the same time, a blank control group was set up, with 30 zebrafish treated at each concentration. At the end of drug treatment, the number of zebrafish deaths in each experimental group was counted to provide a basis for the next experimental concentration design. For the test concentration range of the drugs to be tested, the upper limit was 500 mg/ml (if the maximum solubility was less than 500 mg/ml, the highest solubility should prevail), and the lower limit was 0.001 mg/ml.

2.2 Cardiovascular Effect of Nimodipine Drug Substance on Zebrafish 2.2.1 10 nl was administered via yolk sac injection. After treatment for a certain period of time, 10 zebrafish were randomly selected to have their heart rates counted, and their relative heart rates were calculated for comparison. The results showed that the heart rate slowed down when the concentration reached 32 mg/ml, with that of the rest of the drug-treated groups being normal. The results are listed in Table 13.

TABLE 13

Effect of Nimodipine Drug Substance on Heart Rate of Zebrafish

| Group | Actual Heart Rate (± SD) (beat / min) | Relative Heart Rate (± SD) (%) |
| --- | --- | --- |
| Blank control | 157.5 ± 9.8 | 98.1 ± 6.1 |
| DMSO | 160.5 ± 10.6 | 100.0 ± 6.6 |
| Positive control | 104.7 ± 11.9* | 65.2 ± 7.4* |
| 0.5 mg/ml | 159.0 ± 6.8 | 99.1 ± 4.2 |
| 1.0 mg/ml | 159.6 ± 5.3 | 99.4 ± 3.3 |
| 2.0 mg/ml | 158.4 ± 8.7 | 98.7 ± 5.4 |
| 4.0 mg/ml | 166.5 ± 7.2 | 103.7 ± 4.5 |
| 8.0 mg/ml | 167.1 ± 10.2 | 104.1 ± 6.4 |
| 16 mg/ml | 166.8 ± 10.3 | 103.9 ± 6.4 |
| 32 mg/ml | 144.5 ± 7.4* | 90.0 ± 4.6* |

Note:
*indicates significant differences between the treatment and control groups by statistical analysis ($p < 0.05$).

Positive Control: Terfenadine Tablets 2.2.2 Mortality statistics performed at the end of the experiment showed that the lethality increased with elevated concentrations in the 4.0 mg/ml and higher concentration groups. The results are listed in Table 14.

TABLE 14

Lethality in Zebrafish Induced by Nimodipine Drug Substance

| Group | Mortality (%) |
| --- | --- |
| Blank control | 0 (0/30) |
| DMSO | 0 (0/30) |
| Positive control | 0 (0/30) |
| 0.5 mg/ml | 0 (0/30) |
| 1.0 mg/ml | 0 (0/30) |
| 2.0 mg/ml | 0 (0/30) |
| 4.0 mg/ml | 20 (6/30) * |
| 8.0 mg/ml | 33.3 (10/30) * |
| 16 mg/ml | 50 (15/30) * |
| 32 mg/ml | 80 (24/30) * |

Note:
In this study, zebrafish without both atrial and ventricular beat were considered dead;
* indicates significant differences between the treatment and control groups as tested by fisher's exact test ($p < 0.05$).

Positive Control: Terfenadine Tablets 2.2.3 10 zebrafish in each group were randomly selected and observed under the dissecting microscope. The results showed that the incidence of pericardial edema increased with elevated concentrations in the treatment groups, and the incidence of pericardial edema reached 100% in the highest concentration group of 32 mg/ml, accompanied by circulatory insufficiency in zebrafish. The results are listed in Table 15.

TABLE 15

Edema and Circulatory Deficiency in Zebrafish Induced by Nimodipine Drug Substance

| Group | Incidence of Pericardial Edema (%) | Incidence of Circulatory Insufficiency (%) | Incidence of Decreased Blood Flow (%) |
| --- | --- | --- | --- |
| Blank control | 0 (0/10) | 0 (0/10) | 0 (0/10) |
| DMSO | 0 (0/10) | 0 (0/10) | 0 (0/10) |
| Positive control | 100 (10/10)* | 80 (8/10)* | 20 (2/10) |
| 0.5 mg/ml | 0 (0/10) | 0 (0/10) | 0 (0/10) |
| 1.0 mg/ml | 20 (2/10) | 0 (0/10) | 10 (1/10) |
| 2.0 mg/ml | 30 (3/10) | 10 (1/10) | 10 (1/10) |
| 4.0 mg/ml | 60 (6/10)* | 10 (1/10) | 40 (4/10)* |
| 8.0 mg/ml | 60 (6/10)* | 40 (4/10)* | 10 (1/10) |

TABLE 15-continued

Edema and Circulatory Deficiency in Zebrafish Induced by Nimodipine Drug Substance

| | | Circulatory Deficiency | |
|---|---|---|---|
| Group | Incidence of Pericardial Edema (%) | Incidence of Circulatory Insufficiency (%) | Incidence of Decreased Blood Flow (%) |
| 16 mg/ml | 70 (7/10)* | 40 (4/10)* | 30 (3/10) |
| 32 mg/ml | 100 (6/6)* | 100 (6/6)* | 0 (0/6) |

Note:
*indicates significant differences between the treatment and control groups as tested by fisher's exact test ($p < 0.05$).

Positive Control: Terfenadine Tablets 2.3 Cardiovascular Effect of Nimodipine Solution for Injection (Nimotop) on Zebrafish 2.3.1 Since the highest concentration of Nimotop was only 0.2 mg/ml and its solvent could not be prepared, it was administered via injection of different volumes at the highest concentration. Since the most abundant component in the solvent was 23.7% ethanol, 24% ethanol solution was prepared as the solvent control group to prove that ethanol at this concentration would not affect the experiment. After treatment tier a certain period of time, 10 zebrafish were randomly selected to have their heart rates counted, and their relative heart rates were calculated for comparison. The results showed that no abnormalities were observed in all groups except for the positive control group (terfenadine tablets). The results are listed in Table 16.

TABLE 16

Effect of Nimodipine Solution for Injection on Heart Rate in Zebrafish

| Group | Actual Heart Rate (beat /min) | Relative Heart Rate (%) |
|---|---|---|
| Blank control | 179.7 ± 5.6 | 99.7 ± 3.1 |
| 24% ethanol | 180.3 ± 11.6 | 100.0 ± 6.4 |
| Positive control | 109.2 ± 8.7* | 60.6 ± 4.8* |
| 10 nl | 179.4 ± 9.5 | 99.5 ± 5.2 |
| 20 nl | 173.1 ± 6.0 | 96.0 ± 3.3 |
| 40 nl | 182.4 ± 8.0 | 101.2 ± 4.4 |

Note:
*indicates significant differences between the treatment and control groups as tested by fisher's exact test ($p < 0.05$).

2.3.2 Mortality statistics performed at the end of the experiment showed that no dead individuals were observed. The results are listed in Table 17.

TABLE 17

Lethality in Zebrafish Induced by Nimodipine Solution for Injection

| Group | Mortality (%) |
|---|---|
| Blank control | 0 (0/30) |
| 24% ethanol | 0 (0/30) |
| Positive control | 0 (0/30) |
| 10 nl | 0 (0/30) |
| 20 nl | 0 (0/30) |
| 40 nl | 0 (0/30) |

Note:
In this study, zebrafish without both atrial and ventricular beat were considered dead; Positive control: terfenadine tablets 2.3.3 10 zebrafish in each group were randomly selected and observed under the dissecting microscope. The results showed that except for the positive control group (terfenadine tablets), only 40% of the individuals in the 40 nl group developed pericardial edema, accompanied by circulatory insufficiency and decreased blood flow. The results are listed in Table 18.

TABLE 18

Edema and Circulatory Deficiency in Zebrafish Induced by Nimodipine Solution for Injection

| | | Circulatory Deficiency | |
|---|---|---|---|
| Group | Incidence of Pericardial Edema (%) | Incidence of Circulatory Insufficiency (%) | Incidence of Decreased Blood Flow (%) |
| Blank control | 0 (0/10) | 0 (0/10) | 0 (0/10) |
| 24% ethanol | 0 (0/10) | 0 (0/10) | 0 (0/10) |
| Positive control | 100 (10/10) * | 80 (8/10) | 20 (2/10) * |
| 10 nl | 0 (0/10) | 0 (0/10) | 0 (0/10) |
| 20 nl | 0 (0/10) | 0 (0/10) | 0 (0/10) |
| 40 nl | 40 (4/10) | 30 (3/10) | 10 (1/10) |

Note:
* indicates significant differences between the treatment and control groups as tested by fisher's exact test ($p < 0.05$).

2.4 Cardiovascular Effect of Composition Injection of Present Invention on Zebrafish Three formal experimental concentrations were set. After treatment for a certain period of time, 10 zebrafish were randomly selected to have their heart rates counted, and their relative heart rates were calculated for comparison. The results showed that no abnormalities were observed in all groups except for the positive control group (terfenadine tablets). No dead individual was observed at the end of the experiment, and no abnormalities were observed in all groups except the positive control group. The results are listed in Table 19.

TABLE 19

Effect of Composition Injection of Present Invention on Heart Rate of Zebrafish

| Group | Actual Heart Rate (beat/min) | Relative Heart Rate (%) |
|---|---|---|
| Blank control | 179.4 ± 6.8 | 104.0 ± 3.9 |
| Blank emulsion | 172.5 ± 8.5 | 100.0 ± 4.9 |
| Positive control | 109.2 ± 8.7 | 63.3 ± 5.1 |
| Dilution 9× | 172.8 ± 7.9 | 100.2 ± 4.6 |
| Dilution 3× | 176.1 ± 6.0 | 102.1 ± 3.5 |
| Bulk | 176.7 ± 5.9 | 102.4 ± 3.4 |

2.5 Summary

In the yolk sac injection administration experiment, the lethality in zebrafish increased with elevated concentrations in the 4.0 mg/mL and higher concentration groups of nimodipine drug substance, while pericardial edema and circulatory deficiency could be induced. Nimodipine drug substance induced pericardial edema in 30% of individuals at the administration concentration of 2.0 mg/ml (67 mg/kg), and the nimodipine solution for injection induced pericardial edema in 40% of individuals at the maximum administration dose of 40 nl (26.7 mg/kg), while no cardiovascular toxicity was observed at the maximum administration dose (106.7 mg/kg) of the composition injection of the present invention, indicating that the cardiovascular toxicity of the composition injection of the present invention in zebrafish was less than that of nimodipine solution for injection and nimodipine drug substance.

3. Pharmacodynamic Study of Composition Injection of Present Invention on Rat Subarachnoid Hemorrhage Model 3.1 Pharmacodynamic Test Method 3.1.1 Modeling Method Male SD rats weighing 160-200 g were anesthetized to expose the skull, which was perforated (at the parietal bone behind the lambdoidal suture) with an approximately 1 mm bone drill, but without perforating the dura mater. At the same time, 500 µL of autologous blood was collected from the fundus venous plexus with a 1 mL syringe and inserted into the skull along the bone hole to a depth of 3-4 mm. Biogum was used for sealing to prevent leakage, and the blood was injected slowly, with attention paid to observation. Then Pericam PSI laser microcirculation blood flow imager was used to determine cerebral blood flow in rats.

3.1.2 Grouping and Administration

The experimental animals were randomly divided into 8 groups: the control group with only skull exposed but no blood injection; high, medium, and low dose groups of nimodipine solution for injection; high, medium, and low dose groups of the composition injection of the present invention; and the model group of normal saline. More than 10 rats survived after successful modeling in each group. The administration method and dosage of each group are as follows.

Nimodipine Solution for Injection Group: 2 mg/kg bw for high dose, 1 mg/kg bw for medium dose, and 0.5 mg/kg bw for low dose; the drug concentration was 1 mg/5 mL.

Composition Injection of Present Invention Group: The composition injection of the present invention was diluted to 1 mg/5 mL with normal saline prior to use. 2 mg/kg bw for high dose, 1 mg/kg bw for medium dose, and 0.5 mg/kg bw for low dose.

Model Group: 1 mL/100 g bw of normal saline was injected into the tail vein.

Administration volume and method: 1 mL/100 g bw for high dose, 0.5 mL/100 g bw for medium dose, and 0.25 mL/100 g bw for low dose. The administration via tail vein injection was conducted at the above doses after about 30 min, 48 h, and 96 h after modeling.

3.2 Results 3.2.1 Determination Results of Cerebral Blood Flow

See Table 20 for the determination results of cerebral blood flow before administration after modeling in each group.

TABLE 20

Cerebral Blood Flow (Mean ± SD) before Administration after Modeling in Each Group

| Group | Sagittal Suture Region (Basilar Artery Region) | Whole Cranial Region |
|---|---|---|
| Normal group | 294.44 ± 92.40★ | 275.43 ± 48.84★★★ |
| Model group | 219.63 ± 45.48▲ | 193.30 ± 32.01▲▲▲ |
| Low dose of nimodipine solution for injection-before administration | 190.93 ± 36.3▲▲▲ | 202.01 ± 31.24▲▲▲ |
| Medium dose of nimodipine, solution for injection-before administration | 177.55 ± 22.52★▲▲▲ | 165.93 ± 24.62▲▲▲ |
| Hieh dose of nimodipine solution for injection-before administration | 198.12 ± 32.19▲▲▲ | 186.57 ± 26.78▲▲▲ |
| Low dose of the composition of the present invention-before administration | 211.81 ± 66.28▲▲ | 179.08 ± 45.33▲▲▲ |

TABLE 20-continued

Cerebral Blood Flow (Mean ± SD) before Administration after Modeling in Each Group

| Group | Sagittal Suture Region (Basilar Artery Region) | Whole Cranial Region |
|---|---|---|
| Medium dose of the composition of the present invention-before administration | 189.98 ± 41.52▲▲▲ | 177.53 ± 37.70▲▲▲ |
| High dose of the composition of the present invention-before administration | 193.04 ± 32.48▲▲▲ | 181.40 ± 27.53▲▲▲ |

Comparison between each group and model group after modeling $P < 0.05$★, $P < 0.01$★★, $P < 0.001$★★★.
Comparison between each group and normal group after modeling $P < 0.05$▲, $P < 0.01$▲▲, $P < 0.001$▲▲▲.

After modeling, there were highly significant differences in blood flow within the whole cranial region and sagittal suture region (basilar artery) between each group and the normal group. It indicated that the modeling was successful and the cerebral blood flow perfusion decreased significantly in all groups.

There was no significant difference in blood flow within the whole cranial region and sagittal suture region (basilar artery) between each group of the composition of the present invention and the model group. The blood flow in the sagittal suture region (basilar artery) of the medium dose group of nimodipine solution for injection was significantly different from that of the model group, with no significant differences in the other groups, indicating that the blood flow in the basilar artery of the medium dose group of nimodipine solution for injection after modeling was significantly different from that of the model group.

Cerebral blood flow was determined prior to administration, with timing, and blood flow in the whole cranial region and sagittal suture region was determined again 30 min after administration. See Table 21 and Table 22 below for the results of the one-way ANOVA using EXCEL software.

TABLE 21

Improvements (Mean ± SD) of Cerebral Blood Flow before and after Administration in Each Group

| Group | Sagittal Suture Region | Whole Cranial Region |
|---|---|---|
| Difference before and after administration - low dose of nimodipine solution for injection | 33.75 ± 28.83 | 7.41 ± 42.29 |
| Difference before and after administration - medium dose of nimodipine solution for injection | 15.17 ± 27.47 | 4.04 ± 33.32 |
| Difference before and after administration - high dose of nimodipine solution for injection | 19.75 ± 62.89 | 20.54 ± 48.32 |
| Difference before and after administration - low dose of the composition of the present invention | 13.99 ± 39.85 | 30.94 ± 25.90 |
| Difference before and after administration - medium dose of the composition of the present invention | 14.11 ± 63.07 | 25.40 ± 52.50 |
| Difference before and after administration - high dose of the composition of the present invention | 26.42 ± 28.53 | 23.42 ± 32.45 |

Comparison between groups before and after administration $P < 0.05$ ★, $P < 0.01$ ★★, $P < 0.001$ ★★★.

As seen in Table 21, cerebral blood flow increased to a certain extent in all groups 30 min after administration compared to that before administration. There was no significant difference in the improvement of cerebral blood flow before and after the administration between each dose group of nimodipine solution for injection and the composition of the present invention.

TABLE 22

Cerebral Blood Flow (Mean ± SD) between Different Groups after Administration

| Group | Sagittal Suture Region | Whole Cranial Region |
|---|---|---|
| Normal group | 294.44 ± 92.40★ | 275.43 ± 48.84★★★ |
| Model group | 219.63 ± 45.48 | 193.30 ± 32.01 |
| Low dose of nimodipine solution for injection | 223.93 ± 55.42 | 209.42 ± 56.52 |
| Medium dose of nimodipine, solution for injection | 192.71 ± 27.18 | 169.96 ± 78.03 |
| High dose of inimodipine solution for injection | 219.42 ± 65.60 | 209.08 ± 57.46 |
| Low dose of the composition of the present invention | 225.80 ± 49.14 | 210.02 ± 41.22 |
| Medium dose of the composition of the present invention | 204.09 ± 44.66 | 202.93 ± 33.18 |
| High dose, of the composition. of the present invention | 217.53 ± 43.15 | 205.22 ± 39.65 |

Comparison between each group and model group $P < 0.05$★, $P < 0.01$★★, $P < 0.001$★★★.

As seen in Table 22, there was no significant difference in cerebral blood flow between groups after administration. There was also no significant difference between the same dose groups of nimodipine solution for injection and the composition of the present invention.

After 10 d of modeling, the laser microcirculation blood flow imager was used to determine whole brain and midbrain blood flow in the high dose group of nimodipine solution for injection (3 rats) and the high dose group of the composition of the present invention (4 rats). See Table 23 below for the results of the one-way ANOVA using EXCEL software.

TABLE 23

Cerebral Blood Flow (mean ± SD) for High Dose Groups of the Present invention

| Composition and Nimodipine Group | Solution for Injection 10 Sagittal Suture Region | Days after Modeling Whole Cranial Region |
|---|---|---|
| High dose of the present invention composition-10 d (n = 4) | 198.20 ± 100.07 | 181.81 ± 51.06 |
| High dose of nimodipine solution for injection-10 d (n = 3) | 222.13 ± 4.03 | 192.04 ± 24.83 |

It can be seen from Table 23 that the blood flow in the whole cranial region and sagittal suture region (basilar artery) after 10 days in the high dose groups of nimodipine solution for injection and the present invention composition (3 doses) was basically the same, without significant difference.

Figure 2:
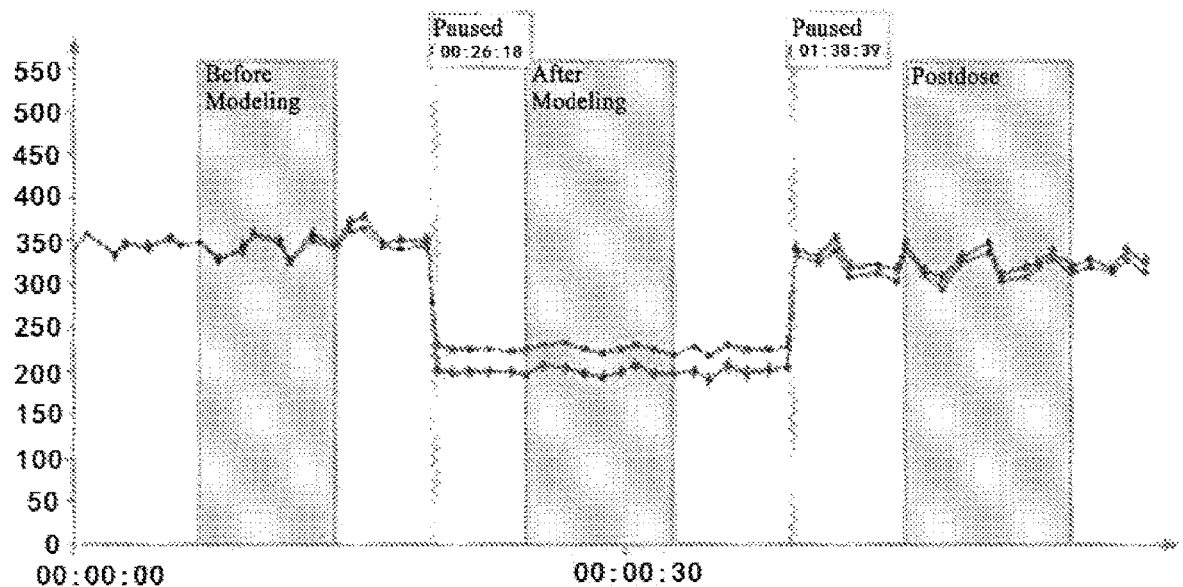
FIG. 2 shows the cerebral blood flow change diagram of No. 16 rat in the high-dose group of the nimodipine solution for injection, with the circular-point curve for the whole brain area, and the diamond curve for the sagittal suture zone.

The cerebral blood flow of the high dose groups of nimodipine solution for injection and the present invention composition before and after modeling and before and after administration are shown in Table 24, and the changes of cerebral blood flow are shown in FIG. 1 and FIG. 2.

TABLE 24

Cerebral Blood Flow (mean ± SD) of the Hiatt Dos Groups of Nimodipine Solution for Injection and the Present Invention Composition

| Group | Sagittal Suture Region | Whole Cranial Region |
|---|---|---|
| High dose of the present invention composition before modeling | 315.94 ± 93.82 | 314.77 ± 73.00 |
| High dose of the present invention composition after modeling | 193.04 ± 32.48 | 181.40 ± 27.53 |
| Reduction in high dose of the present invention composition after modeling | 122.90 | 133.37 |
| High dose of the present invention composition after administration. | 217.53 ± 43.15 | 205.22 ± 39.65 |
| Difference before and after administration in high dose of the present invention composition | 26.42 ± 28.53 | 23.42 ± 32.45 |
| High dose of nimodipine solution for injection before modeling | 306.10 ± 102.35 | 301.90 ± 86.88 |
| High dose of inimodipine solution for injection after modeling | 198.12 ± 32.19 | 186.57 ± 26.78 |
| Reduction in high dose of nimodipine solution for injection after modeling | 107.98 | 115.33 |
| High dose of nimodipine solution for injection after-administration | 29.42 ± 65.60 | 209.08 ± 57.46 |
| Difference before and after administration in high dose of nimodipine solution for injection | 19.75 ± 62.89 | 20.54 ± 48.32 |

The results show that the cerebral blood flow of the whole cranial region and sagittal suture region (basilar artery) of the animals in the high dose groups of both nimodipine solution for injection and the present invention composition decreased significantly after modeling, all of which increased to a certain extent after administration. The improvement effect of the present invention composition was slightly better than that of nimodipine solution for injection at the same dose, but the two groups were basically the same, without significant difference.

3.2.2 Measurement Results of Cerebral Vasospasm Degree

The brain tissue was dehydrated, embedded in paraffin, and the brainstem tissue sections containing the basilar artery were prepared and observed wider a microscope after HE staining and mounting, and the circumference and area of the basilar artery vessels were measured with an image analysis system to determine the degree of cerebral vasospasm. For the results, see Table 25 below.

TABLE 25

| Basilar Artery Circumference and Area(mean ± SD) | | |
|---|---|---|
| Group | Circumference (µm) | Area (µm$^2$) |
| Normal group | 551.73 ± 126.69 | 118669.27 ± 7277.06 |
| Model group | 447.24 ± 127.94 | 13934.68 ± 6852.99 |
| Low dose of nimodipine solution for injection | 594.26 ± 135.17★ | 22730.60 ± 11828.17 |
| Medium. dose of nimodipine solution for injection | 592.57 ± 136.58★ | 23304.12 ± 10688.16 |
| High dose of nimodipine solution for injection | 647.09 ± 140.65★★ | 27385.99 ± 10778.41★★ |
| Low dose of the composition of the present invention. | 567.43 ± 104.38★ | 18825.13 ± 6587.00 |
| Medium dose of the composition of the present invention | 595.82 ± 164.43★ | 22503.74 ± 11587.18 |
| High dose of the present invention composition | 603.41 ± 123.66★ | 24031.65 ± 9632.43★ |

Comparison between each group and model group P <0.05★, P <0.01★★, P <0.001.★★★

From the above table, it can be seen that compared with the normal group, the basilar artery circumference and area in the model group were greatly decreased, indicating that intracranial blood injection induced basilar artery contraction in rats. For section circumference of basilar artery, compared with the model group, the high, medium and low doses of nimodipine solution for injection had significant improvement effect, of which the high dose group had a very significant improvement effect; and the low, medium and high doses of the composition of the present invention also had significant improvement effect.

Because the vessels were easy to deform during later slide preparation, the cross-sectional area of vessels in some animals varied greatly, increasing the intra group SD. Compared with the model group, the cross-sectional area of basilar artery was significantly improved only in the high dose groups of nimodipine solution for injection and the composition of the present invention.

There was no significant difference between the groups at the same dose, but with a certain dose-effect relationship. The circumference and area of the basilar artery increased with the increase of dose.

Based on the improvement on the degree of cerebral vasospasm (circumference and area of basilar artery) in each group, the rank of efficacy is as follows: high dose of nimodipine solution for injection≈high dose of the present invention composition>medium dose of the present invention composition≈medium dose of nimodipine solution for injection≈low dose of nimodipine solution for injection>low dose of the present invention composition.

3.2.3 Results of Behavioral Measures

The rotarod endurance test was performed in the laboratory animals 24 hours, 72 hours, and 5 days after dosing. Refer to Table 26 for results.

TABLE 26

| | Rotarod Endurance Time (seconds, mean ± SD) | | |
|---|---|---|---|
| Group | After 24 h | After 72 h | After 5 d |
| Normal group | 51.0 ± 3.9★★★ | 46.8 ± 9.1★★★ | 46.4 ± 5.3★ |
| Model group | 10.2 ± 2.2 | 12.7 ± 3.4 | 19.7 ± 7.2 |
| Low dose of nimodipine solution for injection | 16.2 ± 4.6 | 19.2 ± 6.9 | 26.2 ± 8.6 |
| Medium dose of nimodipine solution for injection | 20.4 ± 3.8★★ | 18.7 ± 6.2 | 24.5 ± 4.5 |
| High dose of nimodipine solution for injection | 23.4 ± 7.2★★★ | 22.8 ± 4.8★★ | 27.5 ± 4.4 |
| Low dose of the composition of the present invention | 15.0 ± 5.1 | 13.3 ± 7.5 | 20.7 ± 1.2 |
| Medium dose of the composition of the present invention | 19.0 ± 6.9★ | 20.8 ± 2.8★ | 22.7 ± 5.3 |
| High dose of the composition of the present invention | 21.4 ± 6.3★★ | 26.3 ± 6.6★★★ | 56.5 ± 45.0★★ |

Comparison between each group and model group $P < 0.05$★, $P < 0.01$★★, $P < 0.001$★★★

The results of rotarod endurance test show that, compared with the normal group, the rotarod endurance of the model group after modeling decreased significantly after modeling, with a tendency to recover slowly over time.

Twenty-four (24) hours after the first dose, all dose groups had some recovery compared with the model group. Among which, the medium and high dose groups of nimodipine solution for injection, the medium and high dose groups of the present invention composition had significant improvement. There was a significant dose-response relationship among different doses.

After 2 doses (72 hours later), all dose groups also had some recovery compared with the model group. Among which, the high dose group of nimodipine solution for injection, the medium and high dose groups of the present invention composition had significant improvement. There was a certain dose-response relationship among different doses.

After 3 doses (after 5 days), all dose groups also had some recovery compared with the model group. Among which, the high dose group of the present invention composition had significant improvement. There was a certain dose-response relationship among different doses.

Open field spontaneous activity test was performed in the laboratory animals 24 hours, 72 hours and 5 days after dosing. The video monitoring system was enabled to record the activity distance and duration of rats within 5 min. The results are shown in Tables 27 and 28.

TABLE 27

| | Activity Distance (cm/5 min, mean ± SD) | | |
|---|---|---|---|
| Group | After 24 h | After 72 h | After 5 d |
| Normal group | 1557.2 ± 306.8★ | 1557.2 ± 306.8★ | 1557.2 ± 306.8★ |
| Model group | 1111.9 ± 514.2 | 1301.5 ± 410.3 | 920.3 ± 462.6 |
| Low dose of nimodipine solution for injection | 1490.9 ± 553.2 | 1268.6 ± 627.1 | 841.6 ± 583.5 |
| Medium dose of nimodipine solution for injection | 1241.9 ± 580.0 | 1326.3 ± 821.2 | 1288.0 ± 353.1 |
| High dose of nimodipine solution for injection | 1592.5 ± 299.3 | 1421.0 ± 38.9 | 869.3 ± 453.7 |
| Low dose of the composition of the present invention | 1408.4 ± 862.1 | 1724.3 ± 644.5 | 1166.8 ± 648.7 |
| Medium dose of the composition of the present invention | 1441.9 ± 354.4 | 1478.0 ± 1022.6 | 955.2 ± 466.7 |
| High dose of the composition of the present invention | 954.2 ± 768.2 | 1111.2 ± 508.5 | 1526.3 ± 179.0★ |

Comparison between each group and model group $P < 0.05$★, $P < 0.01$★★, $P < 0.001$★★★

TABLE 28

| | Activity Duration (s/5 min, mean ± SD) | | |
|---|---|---|---|
| Group | After 24 h | After 72 h | After 5 d |
| Normal group | 195.40 ± 15.72★ | 195.40 ± 15.72★ | 195.40 ± 15.72★ |
| Model group | 157.19 ± 37.95 | 157.19 ± 37.95 | 120.50 ± 34.74 |
| Low dose of nimodipine solution for injection | 199.82 ± 31.11 | 160.43 ± 63.80 | 123.61 ± 70.94 |
| Medium dose of nimodipine solution for injection | 156.98 ± 57.56 | 181.09 ± 36.51 | 160.88 ± 30.87 |
| High dose of nimodipine solution for injection | 196.84 ± 36.54★ | 206.21 ± 14.84★ | 124.66 ± 41.69 |
| Low dose of the composition of the present invention | 106.44 ± 44.73 | 129.91 ± 43.42 | 129.03 ± 64.83 |
| Medium dose of the composition of the present invention | 200.73 ± 20.92★ | 179.42 ± 52.92 | 146.13 ± 33.15 |
| High dose of the composition of the present invention | 146.49 ± 53.32 | 171.67 ± 26.82 | 183.36 ± 18.88 |

Comparison between each group and model group $P < 0.05$ ★, $P < 0.01$ ★★, $P < 0.001$ ★★★.

From the results in Tables 27 and 28, it can be seen that, compared with the normal group, the activity distance and duration within 5 minutes in the model group after modeling were significantly decreased, and there was no significant trend to change the mobility over time.

Distance and duration of activity had been improved, overall mobility had been increased, and there was also a slight improvement with the increase of doses. Compared with the model group, the activity distance of the high dose group of the present invention composition was significantly improved at 5 d after dosing; the activity duration of the high dose group of the nimodipine solution for injection and the medium dose group of the present invention composition was also significantly improved, but without significant difference.

3.3 Adverse Reactions in Pharmacodynamic Tests

Nimodipine solution for injection contained high concentrations of ethanol, thus rendering a strong "anesthetic" effect in intravenous injection, from which it took about 10-30 min for rats to recover slowly after injection. For nimodipine solution for injection, the experimental results showed that there were significant toxic and adverse effects in the high dose group, with the death of several animals during the administration. After multiple doses of the nimodipine solution for injection, several animals developed significant phlebitis and tail ulceration. However, for the injection with the composition of this invention, there were no deaths or any other observed adverse effects in every dose group during the administration.

In summary, the efficacy of the composition injection of the present invention at the same dose is basically equivalent to that of nimodipine solution for injection, without significant difference. However, no toxic side effects and other adverse reactions were observed in the composition injection of the present invention during the test. Therefore, the composition injection of the present invention has the same efficacy as the commercial nimodipine solution for injection and the nimodipine emulsion injection by the prior art, but with better safety.

IV. Determination of the Plasma Concentration of the Composition Injection of the Present Invention Male SD rats were selected and acclimated for 2 days, and then anesthetized by intraperitoneal injection of 5% chloral hydrate (prepared with normal saline) with the same anesthetic dose as above. After anesthesia, the animals were numbered and divided into the present invention composition group and the Nimotop (nimodipine solution for injection) group. The rats were intravenously injected into the tail vein at a dose of 2 mg/kg bw. At 10, 30, 90, and 120 min after dosing, 0.3 ml blood was collected from the fundus venous plexus of rat inner canthus and placed into a pre-heparinized blood collection tube, centrifuged at 4000 rpm for 10 min, and the upper plasma was taken and stored at −80° C.

Nimodipine plasma samples were assayed by UPLC-PDA method. The sample plasma was processed one by one and injected for analysis, and the concentration of nimodipine in the plasma was calculated. The results are shown in Table 29. The plasma concentration-time curves were plotted against the plasma concentration (ng/ml) versus time (min). The results are shown in the attached FIG. 3.

TABLE 29

| | Nimodipine Plasma Concentration (ng/ml) | | | |
|---|---|---|---|---|
| Time | Nimodipine Solution for Injection Group (ng/ml) | | The Present Invention Composition Group (ng/ml) | |
| (min) | Mean | SD | Mean | SD |
| 10 | 388.6 | 82.8 | 435.4 | 91.7 |
| 30 | 152.0 | 6.2 | 156.3 | 39.3 |
| 90 | 71.8 | 28.7 | 86.6 | 19.3 |
| 120 | 42.2 | 7.6 | 43.5 | 1.5 |

Figure 3:
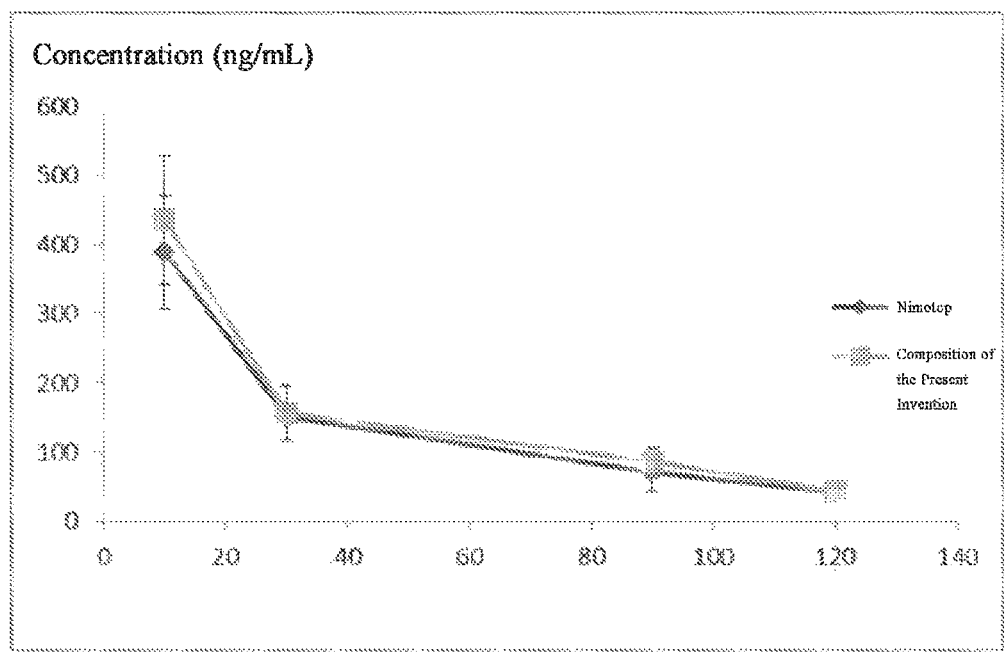
FIG. 3 shows the plasma concentration-time curves of the nimodipine solution for injection and the composition of the present invention.

It can be seen from Table 29 and FIG. 3 that the plasma concentration of the present invention composition group was basically equivalent to that of the nimodipine solution for injection group, and the plasma concentration-time curve was also basically the same.

What is claimed is:

1. A nimodipine injection composition, comprising the following components in parts by mass concentration: 0.8-0.18% of nimodipine, 8-12% of oil for injection, 1-2% of emulsifier selected from the group consisting of soya lecithin, egg yolk lecithin and mixtures thereof, 0-0.01% of complexing agent, 0-0.1% of stabilizer selected from the group consisting of oleic acid, sodium oleate and mixtures thereof, and 2-2.5% of osmotic pressure adjusting agent, wherein the injection composition does not include any other emulsifier or any other stabilizer;
    wherein the soya lecithin or egg yolk lecithin comprises 70-85% of phosphatidylcholine (PC) and 5-18% of phosphatidylethanolamine (PE); and the oil for injection is a mixture of soybean oil and medium-chain triglyceride having a mass ratio of soybean oil to medium-chain triglyceride of 4:6.

2. The injection composition according to claim 1, wherein the injection composition has a pH value of 6.0-8.5.

3. The injection composition according to claim 2, wherein the injection composition has a pH value of 6.5-8.0.

4. The injection composition according to claim 3, wherein the injection composition has a pH value of 7.0-7.5.

5. The injection composition according to claim 1, wherein the complexing agent is one or more selected from the group consisting of calcium disodium edetate, disodium edetate, sodium edetate and edetate acid.

6. The injection composition according to claim 5, wherein the complexing agent is disodium edetate.

7. The injection composition according to claim 1, wherein a mean particle size of the injection composition is 100-600 nm.

8. The injection composition according to claim 7, wherein the mean particle size of the injection composition is 120-400 nm.

9. The injection composition according to claim 8, wherein the mean particle size of the injection composition is 140-300 nm.

10. The injection composition according to claim 1, wherein the osmotic pressure adjusting agent is glycerol.

11. The injection composition according to claim 1, wherein the emulsifier is egg yolk lecithin and the stabilizer is oleic acid.

12. A method of treating cerebral vasospasm after subarachnoid hemorrhage and/or improving blood circulation in convalescence of cerebrovascular disease, the method comprising administering the injection composition according to claim 1 to a subject in need thereof.

\* \* \* \* \*